Dec. 10, 1940.  P. E. MACK  2,224,309

TRANSMISSION

Filed Dec. 27, 1938  2 Sheets-Sheet 1

Inventor
Perry E. Mack

Dec. 10, 1940.　　　P. E. MACK　　　2,224,309
TRANSMISSION
Filed Dec. 27, 1938　　　2 Sheets-Sheet 2
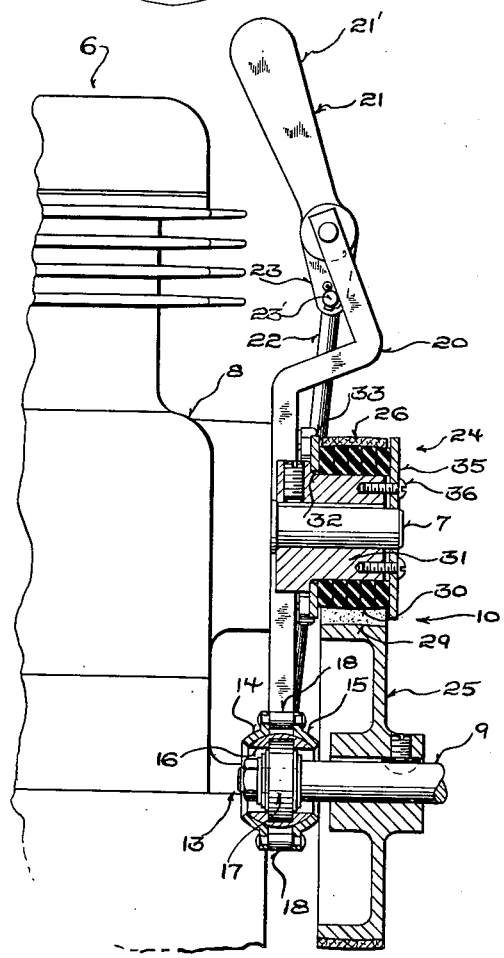
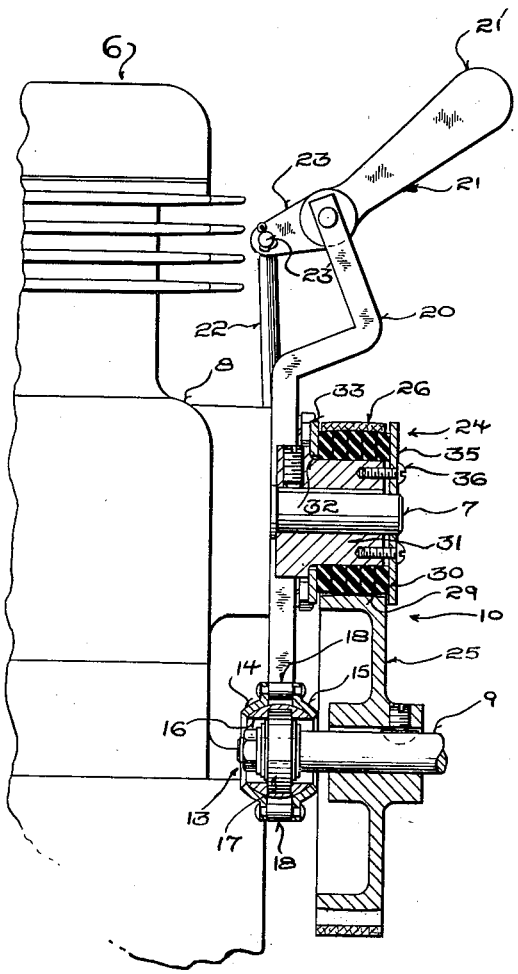
Inventor
Perry E. Mack Patented Dec. 10, 1940

2,224,309

UNITED STATES PATENT OFFICE 2,224,309

TRANSMISSION

Perry E. Mack, Milwaukee, Wis., assignor to Briggs & Stratton Corporation, Milwaukee, Wis., a corporation of Delaware Application December 27, 1938, Serial No. 247,859

2 Claims. (Cl. 74—203)

This invention relates to transmissions and more particularly to transmissions for use in small launches.

Various types of transmissions have been provided for this purpose in the past, chief among which was the type similar to that used in automobiles. This particular type of transmission was quite expensive for small installations inasmuch as it entailed complicated arrangements of gears, speed reducers, a clutch, etc.

Another type of transmission was that in which a jaw clutch was employed to transmit the drive from the crankshaft of the engine to the propeller shaft. This type of transmission was also found undesirable due to the difficulty of engaging the clutch parts while the engine was in operation and to the fact that no "reverse" was possible.

This invention, therefore, has as one of its objects to provide a transmission of the character described which is extremely simple in design but which readily connects the propeller shaft with the drive shaft for "forward" or "reverse" rotation.

Another object of this invention is to provide a power transmission to the propeller shaft which includes a friction member encircling parts of each shaft to drivingly connect the same for rotation of the propeller shaft in a "forward" direction.

Another object of this invention is to provide a transmission of the character described in which the propeller shaft is capable of movement toward and from the drive shaft and when moved to an intermediate position renders the driving connection inoperative and establishes a "neutral" condition.

Still another object of this invention is to provide a transmission of the character described so constructed that cooperating parts on each of the shafts are mutually engageable upon movement of the propeller shaft toward the drive shaft beyond its "neutral" position to establish a "reverse" driving connection for the propeller shaft.

A further object of this invention is to provide manually operable means for readily shifting the propeller shaft with respect to the drive shaft to establish "forward," "reverse," and "neutral" positions thereof.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein-disclosed invention may be made as come within the scope of the claims.

The accompanying drawings illustrate one complete example of the physical embodiment of the invention constructed in accordance with the best mode so far devised for the practical application of the principles thereof, and in which:

Figure 4 is a view similar to Figure 2 illustrating the transmission in "forward" position; and Figure 5 is a view similar to Figure 2 illustrating the transmission in "reverse" position.

Figure 1:
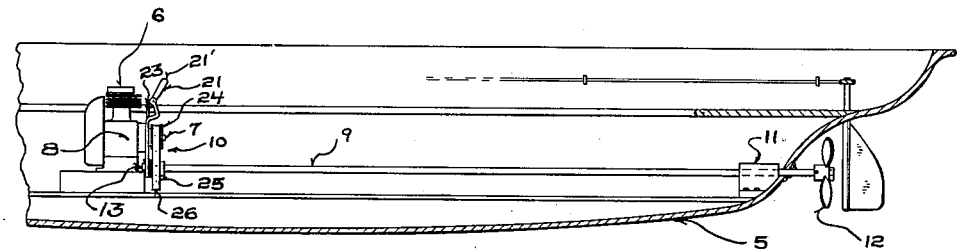
Figure 1 is a vertical sectional view through a portion of a launch illustrating the transmission of this invention applied thereto.

Referring now particularly to the accompanying drawings, in which like numerals indicate like parts, the numeral 5 designates a small launch, only a portion of which is shown. Mounted approximately in the center of the launch is a small internal combustion engine 6, which supplies the motive power for the launch.

The crankshaft 7 of the engine projects rearwardly a short distance through the crankcase 8 to be connected with a propeller shaft 9 through a power transmission indicated generally by the numeral 10. As will be hereinafter more fully described, the power transmission selectively transmits power to the propeller shaft for propelling the boat in a "forward" or "reverse" direction and is operable to a "neutral" position in which the propeller shaft is disconnected from the crankshaft. The rear end of the propeller shaft 9 is journalled in a stationary bearing 11 and mounts the propeller 12.

At its forward end, adjacent to the crankcase and directly beneath the crankshaft, the propeller shaft 9 is supported in a universal bearing 13 which comprises two complementary lever-like members 14 and 15 having a ball and socket connection 16 between them medially of their ends and in which the end of the propeller shaft 9 is suitably journalled as by a ball bearing 17. The members 14 and 15 are securely held together in spaced apart relationship by rivets or other securing means 18.

The bearing 13 is mounted for bodily movement in a plane substantially perpendicular to the axis of the propeller shaft to carry the front end of the propeller shaft toward and from the crankshaft. It is to be understood that the propeller shaft is of such length and diameter as to permit the same to be flexed as required for movement of its front end toward and from the crankshaft.

In the present construction, one end of the bearing 13 is pivotally connected, as at 19, to a support secured to the crankcase so that the bearing has a swinging or oscillatory movement which is guided by a guide 20 projecting down from the crankcase and disposed between the members 14 and 15 at the free end of the bearing.

Bodily movement of the bearing 13 is produced by a lever 21 pivoted to the upper end of the guide 20 and connected with the free end of the bearing by a link 22. The long arm 21' of the lever forms a handle by which the lever is moved about its pivot, while its shorter arm 23 has the link connected thereto as by passing a lateral projection 23' thereon through a hole in the free end of the arm 23.

Figure 2:
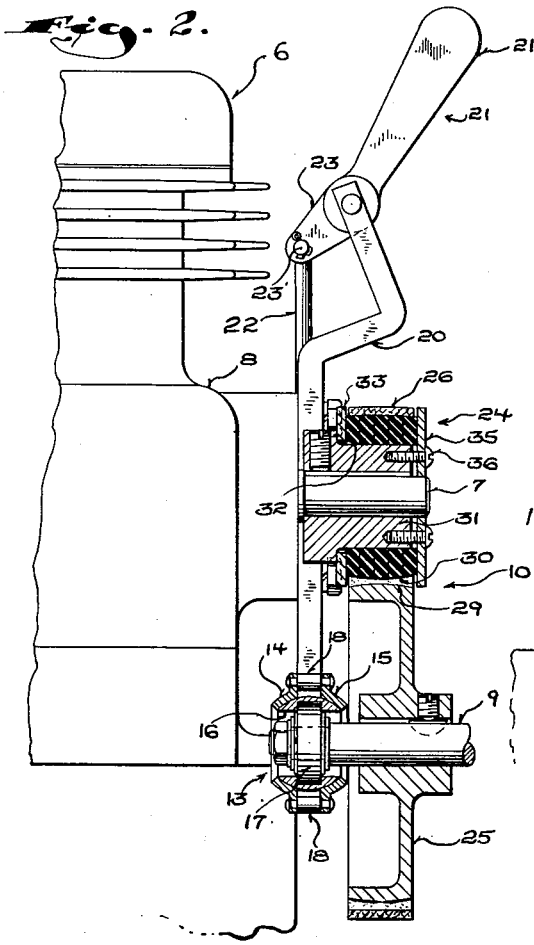
Figure 2 is an enlarged view in elevation showing part of the engine and the transmission in its "neutral" position with parts of the transmission broken away and in section.
Figure 3:
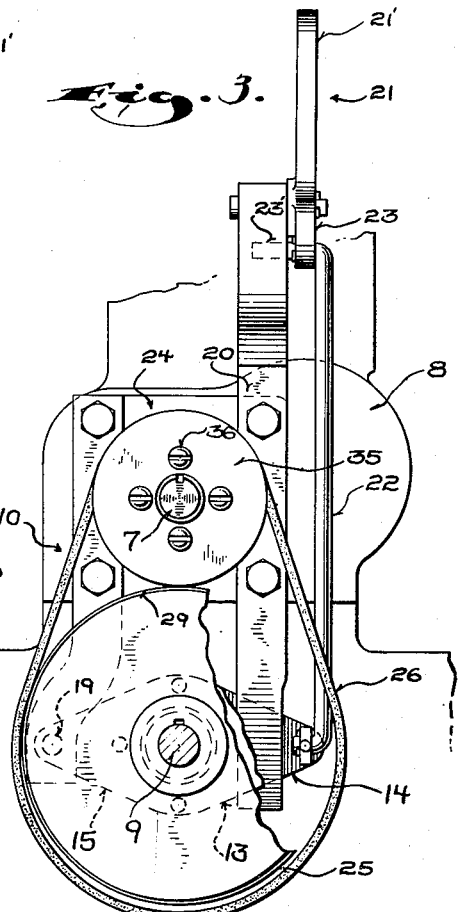
Figure 3 is an end view of the transmission as shown in Figure 2.

The means for transmitting driving force from the crankshaft to the propeller shaft includes pulleys 24 and 25 fixed to the crankshaft and the propeller shaft, respectively, and about which a friction belt 26 is trained. The belt 26 is of such length as to hang loosely about the pulley 25 when the propeller shaft is in its normal unflexed position parallel to the crankshaft. With this position of the parts, the transmission is in "neutral," as clearly illustrated in Figure 2; and as long as the propeller shaft remains unflexed, the "neutral" position will be automatically maintained.

Movement of the handle 21' to shift the bearing downwardly carries the forward end of the propeller shaft away from the crankshaft and engages the pulley 25 with the friction belt 26 to drive the propeller shaft for "forward" propulsion of the launch.

In effecting this flexure of the propeller shaft, the connection between the lever 23 and the link 22 is carried past dead center which occurs when the lever passes beyond alignment with the link. Hence, by limiting the motion of the lever at this point, the resilience of the propeller shaft releasably maintains the transmission in its "forward" setting. To so limit the motion of the lever, the projection 23' strikes the adjacent edge of the guide 20.

Movement of the lever 21 to shift the bearing upwardly carries the forward end of the propeller shaft toward the crankshaft and engages the periphery 29 of the pulley 25 with the periphery of a plurality of friction discs 30 which are carried by the crankshaft pulley 24. In this manner, the "forward" driving connection between the shafts is rendered inoperative, while the "reverse" connection becomes operative, the propeller shaft being driven directly from the crankshaft.

The hub 31 of the pulley 24, which is securely fixed to the crankshaft, has its rearwardly extending end reduced in diameter to form a shoulder 32. Slidably received on the reduced end portion of the hub 31 is a flange 33 which engages the shoulder 32. To facilitate replacement, the discs 30 which have a substantially high coefficient of friction are removably secured on the hub by a flange 35 fixed to the outer end of the hub by screws 36. The flanges 33 and 35 are larger in diameter than the friction discs 30 and thus serve to positively retain the belt 26 on the pulley.

For "reverse" operation, it is desirable to insure the presence of the operator; and to this end, no provision has been made to lock the parts in "reverse" position. Such operation entails the lever being held back by the operator.

While the transmission of this invention has been described as transmitting power from the drive shaft of an internal combustion engine to the propeller shaft of a launch, it is desired to point out that it is equally well suited for use on many other types of power drives where the torque of the drive shaft is not too high.

From the foregoing description taken in connection with the accompanying drawings, it will be readily apparent to those skilled in the art that this invention affords a simple inexpensive and easily operated transmission for use with small launches or other power operated devices.

What I claim as my invention is:

1. In combination: a pulley; a one piece resilient shaft; bearings journalling the shaft with a free end portion of substantial length yieldingly held by its own resiliency in a neutral substantially straight line position; another pulley on said end of the resilient shaft opposite the first named pulley, said pulleys having friction surfaces engageable upon flexure of the resilient shaft out of its neutral straight line position to establish a one direction driving connection between the flexible shaft and the first named pulley; a belt encircling the pulleys, said belt being loose when the resilient shaft is in its neutral unflexed position; means for flexing the resilient shaft in a direction away from the first named pulley to tighten the belt about the pulleys and establish a reverse driving connection between the flexible shaft and the first named pulley; and means for forcing the resilient shaft out of its neutral straight line position against the resiliency thereof to establish said driving connections.

2. In a transmission of the character described: a fixed shaft; another shaft of such proportions and material as to be substantially resilient to permit a degree of lateral flexure thereof while tending at all times to remain in an axially straight unflexed position, said other shaft having a free end adjacent to the fixed shaft; a bearing for the opposite end of said other shaft; means for reversibly drivingly connecting said shafts comprising, pulleys on said shafts and a belt encircling the pulleys; the length of the belt and the resiliency of said other shaft being such as to normally maintain its pulley disengaged from the belt and the pulley on the fixed shaft so that the driving connection between the shafts is inoperative; means for flexing said other shaft in a direction to tighten the belt about the pulleys and thereby establish a one direction driving connection between the shafts, such flexing of said other shaft being opposed by its inherent resiliency; and means connected with said other shaft and dependent upon the tendency of said other shaft to maintain an axially straight unflexed position for releasably holding said other shaft in said flexed position thereby maintaining said one direction driving connection between the shafts operative.

PERRY E. MACK.